(12) United States Patent
Fujiwara

(10) Patent No.: US 9,776,490 B2
(45) Date of Patent: Oct. 3, 2017

(54) WINDOW MODULE

(71) Applicant: NIPPON SHEET GLASS CO., LTD., Tokyo (JP)

(72) Inventor: Kazuhiro Fujiwara, Shiga (JP)

(73) Assignee: Nippon Sheet Glass Co., Ltd., Tokyo (JP)

( * ) Notice: Subject to any disclaimer, the term of this patent is extended or adjusted under 35 U.S.C. 154(b) by 205 days.

(21) Appl. No.: 14/442,419

(22) PCT Filed: Nov. 6, 2013

(86) PCT No.: PCT/JP2013/006543
§ 371 (c)(1),
(2) Date: May 13, 2015

(87) PCT Pub. No.: WO2014/091668
PCT Pub. Date: Jun. 19, 2014

(65) Prior Publication Data
US 2016/0272055 A1    Sep. 22, 2016

(30) Foreign Application Priority Data

Dec. 10, 2012 (JP) .................................. 2012-269661

(51) Int. Cl.
*B60J 10/82* (2016.01)
*B60J 7/043* (2006.01)
(Continued)

(52) U.S. Cl.
CPC .............. *B60J 10/82* (2016.02); *B60J 7/043* (2013.01); *B60J 10/22* (2016.02); *B60J 10/24* (2016.02); *B60J 10/30* (2016.02); *B60J 10/74* (2016.02)

(58) Field of Classification Search
CPC ............. B60J 10/82; B60J 10/74; B60J 7/043
(Continued)

(56) References Cited

U.S. PATENT DOCUMENTS 5,170,587 A * 12/1992 Nakatani ............... E06B 7/2314
                                                            296/216.09
6,224,145 B1 * 5/2001 Sugiura .................. B62D 25/06
                                                            296/210
(Continued)

FOREIGN PATENT DOCUMENTS

FR         2898181 B1     4/2008
GB         1375248     * 11/1974
(Continued)

OTHER PUBLICATIONS

State Intellectual Patent Office, First Office Action issued in corresponding Chinese patent application No. 201380064288.2, dated Jul. 1, 2016, 9 pages with English translation, China.
(Continued)

*Primary Examiner* — Dennis H Pedder
(74) *Attorney, Agent, or Firm* — Marshall & Melhorn, LLC

(57) ABSTRACT

In a window module including a molding molded along the peripheral part of a window panel in situ, the deformation of the molding due to the shrinkage following the molding process is controlled. The window module comprises a window panel and a molding molded on and attached to a peripheral part of the window panel. The molding comprises a base portion extending along and attached to the peripheral part and a projection projecting from and extending along the peripheral part, and the projection is provided with an easily deformable portion at least in a part of the projection located along a lengthwise direction of the peripheral part, the easily deformable portion being deformable in the lengthwise direction of the peripheral part more readily than a remaining part of the projection.

4 Claims, 12 Drawing Sheets

(51) Int. Cl.
*B60J 10/24* (2016.01)
*B60J 10/30* (2016.01)
*B60J 10/74* (2016.01)
*B60J 10/22* (2016.01)

(58) Field of Classification Search
USPC ............. 296/216.06–216.09, 84.1, 93, 96.21
See application file for complete search history.

(56) References Cited

U.S. PATENT DOCUMENTS

| | | | |
|---|---|---|---|
| 6,893,084 B2 | 5/2005 | Tamura et al. | |
| 7,360,826 B2 | 4/2008 | Nakagawa et al. | |
| 7,628,448 B2 * | 12/2009 | Katayama | B60J 10/235 296/213 |
| 8,152,229 B2 | 4/2012 | Horiuchi et al. | |
| 2002/0109370 A1 * | 8/2002 | Lagrue | B60J 10/70 296/96.21 |

FOREIGN PATENT DOCUMENTS

| | | |
|---|---|---|
| JP | S63215417 A | 9/1988 |
| JP | 04-317818 A | 11/1992 |
| JP | 06-057779 U | 8/1994 |
| JP | 2003127660 A | 5/2003 |
| JP | 2003211967 A | 7/2003 |
| JP | 2005-008048 A | 1/2005 |
| JP | 2006-327475 A | 12/2006 |
| JP | 2008221878 A | 9/2008 |
| JP | 2010-095129 A | 4/2010 |
| WO | 2012/109402 A1 | 8/2012 |

OTHER PUBLICATIONS

Japanese Patent Office, Japanese Office Action issued in corresponding Japanese patent application No. 2012-269661, dated Sep. 6, 2016, 7 pages with English translation, Japan.

Japanese Patent Office, Japanese Office Action issued in corresponding Japanese application No. 2012-269661, dated Apr. 4, 2017, 8 pages, Japan.

* cited by examiner (A)

(B)

WINDOW MODULE

TECHNICAL FIELD

The present invention relates to a window module configured to be fitted in an opening of a vehicle or the like.

BACKGROUND ART

Conventionally, a window module is used for closing a window opening such as a sunroof opening formed in a vehicle. A window module comprises a window panel made of a sheet of glass or plastic and a plastic molding attached to the peripheral part of the window panel. The molding is made of thermoplastic resin, and is attached to the peripheral part of the window panel by being molded thereon in situ. The molding seals the gap between the window panel and the window opening by resiliently engaging the opposing edge of the window opening. It is known in a window module for opening and closing a sunroof opening to form a molding along the edge of a window panel, providing an engagement groove extending along the length of the molding, and preparing a hollow weather strip provided with an engagement portion along a side thereof so that the weather strip may be placed along the length of the molding by engaging the engagement portion with the engagement groove (See Patent Document 1, for instance). The window module disclosed in Patent Document 1 allows the highly flexible weather strip to be attached to the peripheral part of the window panel without requiring a bonding agent.

PRIOR ART DOCUMENT(S)

Patent Document(s)

Patent Document 1: JP2006-327475A

SUMMARY OF THE INVENTION

Task to be Accomplished by the Invention

The molding that has been molded along the peripheral part of a window panel shrinks as the temperature thereof drops following the molding process. On the other hand, the window panel does not shrink so that the shrinkage of the molding is slight in the part thereof adjoining the window panel but is significantly greater in the part thereof remote from the window panel. Therefore, the part of the molding remote from the window panel is pulled by the part of the molding adjacent to the window panel so that the part of the molding remote from the window panel is subjected to a tensile stress. If this tensile stress is significant, the deformation (strain) of the molding may be so great that the configuration of the molding, in particular the configuration of the engagement groove, deviates from the originally designed configuration. Such a deviation causes a play between the engagement groove and the engagement portion of the weather strip, and the force that is available for retaining the weather strip is thereby reduced. In particular, in the part adjoining each rounded corner portion of the window panel, the combined force of the tensile stress acting longitudinally along the molding is directed toward the center of the curvature of the adjoining part of the molding, and the molding inevitably deforms in the corresponding direction. To overcome this problem, it is conceivable to design the molding die by taking into account such deformation of the molded molding so that the molding may assume the designed configuration after it has undergone the deformation. However, designing a molding die by taking into account the predicted deformation of the molding requires massive computation and/or numerous test molding dies, thereby requiring much efforts and expenses.

The present invention was made in view of such problems of the prior art, and has a primary object to provide a window module including a molding molded along the peripheral part of a window panel in situ which is free from the problem associated with the shrinkage following the molding process.

To achieve such an object, the present invention provides a window module (5), comprising a window panel (7) and a molding (10) molded on and attached to a peripheral part (8) of the window panel, wherein: the molding comprises a base portion (15) extending along and attached to the peripheral part; and a projection (16) projecting from and extending along the peripheral part; the projection being provided with an easily deformable portion (41) at least in a part of the projection located along a lengthwise direction of the peripheral part, the easily deformable portion being deformable in the lengthwise direction of the peripheral part more readily than a remaining part of the projection. The "peripheral part" of the window panel as used herein means the part of the window panel which defines the profile of the window panel as seen from a direction opposing the major plane of the window panel, and may include linear sections, corner portions and curving portions, defining an annular configuration as a whole. The molding is provided on at least a part of the peripheral part of the window panel, and may be provided only in the linear sections or in the corner portions. In a certain embodiment, the molding is provided over the entire peripheral part, thereby defining an annular configuration. The "lengthwise direction" of the peripheral part as used herein means the direction along which the linear sections, the corner portions and/or curving portions extend.

Owing to this arrangement, the easily deformable portion mitigates the stress by deformation thereof so that the stress applied to the remaining part of the projection is reduced, and the deformation of the remaining part is controlled.

In the present invention, the window module may further comprise a weather strip (11) including an engagement portion (32), the projection being provided with an engagement groove (27) for engaging the engagement portion of the weather strip.

According to this arrangement, even when the molding is subjected to internal stresses following the molding process, the resulting deformation of the easily deformable portion reduces the stress that is produced in the projection so that the engagement groove is allowed to maintain the originally designed shape. Thereby, the engagement groove is enabled to retain the engagement portion of the weather strip in an appropriate manner.

According to a certain aspect of the present invention, the peripheral part of the window panel includes a corner portion (13) curving in an arcuate shape, and the easily deformable portion is located in a part including a start point (42, 43) at which the corner portion starts curving.

According to this arrangement, the deformation of the projection adjoining the corner portion due to the shrinking following the molding process can be controlled. In a linear section of the peripheral part of the window panel, the projection is subjected to tensile stress directed in the lengthwise direction owing to the shrinkage following the molding process. Suppose that the direction in parallel with the major surface of the window panel is referred to as "inward" when directed toward the center of the window panel, and as "outward" when directed in the opposite direction. Then, because the stress produced in the linear section of the projection is directed perpendicular to the inward-outward direction of the window panel, the deformation of the projection in the inward-outward direction of the window panel is relatively small. On the other hand, in the corner portion, because the projection extends along a curved path, the tensile stress applied to the projection in the lengthwise direction gives rise to a combined force which deforms the projection toward the center of the curvature (inward with respect to the window panel). As a result, the deformation of the projection in the corner portion is relatively great. The easily deformable portion mitigates the tensile stress in each end portion of the corner portion so that the stress in the part of the projection corresponding to the corner portion is reduced, and the projection is maintained in the originally designed shape. In particular, when the easily deformable portion is formed in a part including a start point at which the curving of the corner portion starts, the tensile stress produced from each linear section adjoining the corner portion is blocked, and is thereby prevented from reaching the corner portion so that the deformation of the projection in this region is controlled in a highly effective manner.

According to another aspect of the present invention, an engagement hole (95) is provided in one of the base portion (92) and the projection (93) along a lengthwise direction thereof, and an engagement piece portion (94) configured to be engaged by the engagement hole is provided in the other of the base portion and the projection along a lengthwise direction thereof, the projection being caused to take a tubular configuration by the engagement piece portion being engaged by the engagement hole.

According to this arrangement, the projection is enabled to maintain the originally designed tubular configuration because the easily deformable portion mitigates the tensile stress in the projection.

According to yet another aspect of the present invention, the easily deformable portion is provided in a free end portion (99) of the projection which is concealed by a base end portion (97) of the projection from view from outside of the window panel when the engagement piece portion is engaged by the engagement hole.

According to this arrangement, because the easily deformable portion is not visible from the exterior of the vehicle, the esthetic effect of the molding is maintained.

According to yet another aspect of the present invention, the easily deformable portion is provided with a smaller thickness than a remaining part of the projection. The easily deformable portion may also be provided with a bellows structure, or may comprise a slit.

According to such arrangements, the easily deformable portion facilitates the elongation and contraction of the projection in the lengthwise direction of the molding.

Effect of the Invention

According to such arrangements, in a window module including a molding molded along the peripheral part of a window panel in situ, the deformation of the molding due to the shrinkage following the molding process can be controlled.

DESCRIPTION OF THE PREFERRED EMBODIMENT(S)

Two window modules each configured to be fitted in an opening of a vehicle given as two different embodiments of the present invention are described in the following with reference to the appended drawings. In the following description, various directions are defined with respect to the traveling direction of the vehicle.

Figure 1:
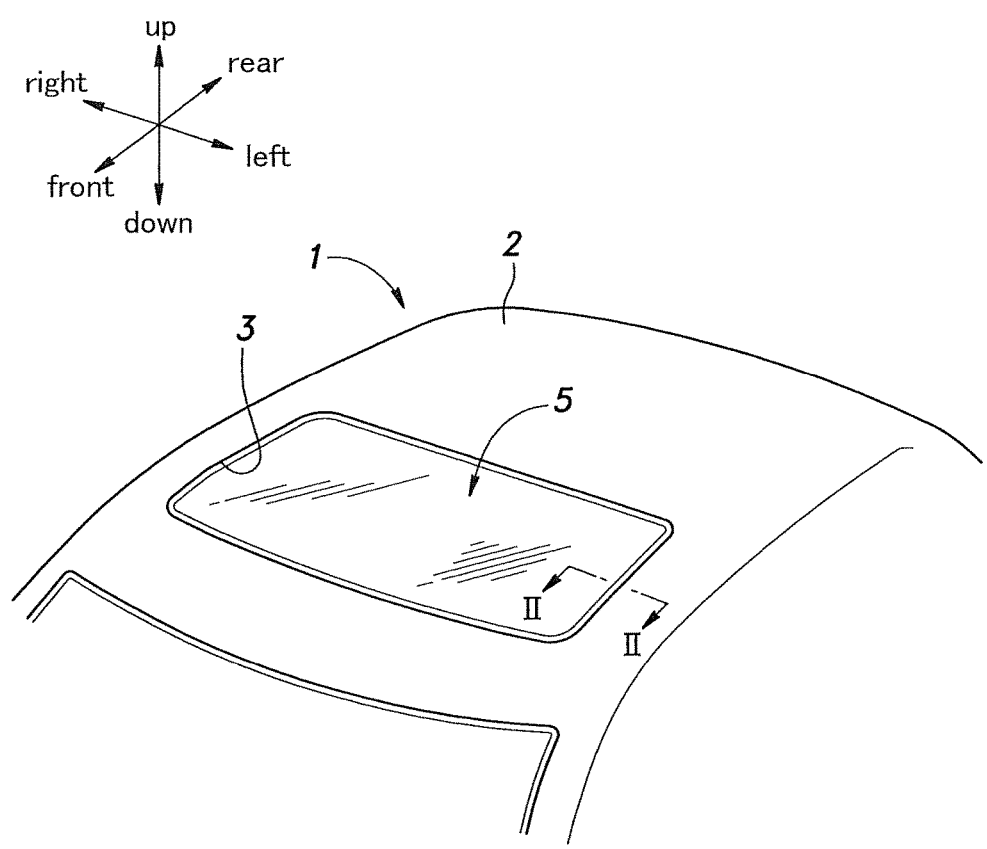
FIG. 1 is a perspective view showing an upper structure of a vehicle including the window module of the first embodiment of the present invention fitted in a sunroof opening.

FIG. 1 is a perspective view showing an upper structure of a vehicle including the window module of the first embodiment fitted in a sunroof opening. As shown in FIG. 1, a roof 2 of a vehicle body 1 is formed with a substantially rectangular sunroof opening 3 communicating the interior of the vehicle with the exterior thereof. The sunroof opening 3 can be selectively closed by a window module 5. An opening mechanism (not shown in the drawings) is provided along the edge of the sunroof opening 3 to support the window module 5. The opening mechanism may include a pair of guide rails extending in the fore and aft direction along either edge of the sunroof opening 3, a pair of sliders slidably supported by the respective guide rails and an actuator for moving the sliders along the corresponding guide rails. The window module 5 may be moveable under the action of the opening mechanism between a closed position in which the window module 5 is fitted in the sunroof opening 3 and an open position in which the window module 5 is located outside of and behind the sunroof opening 3.

Figure 2:
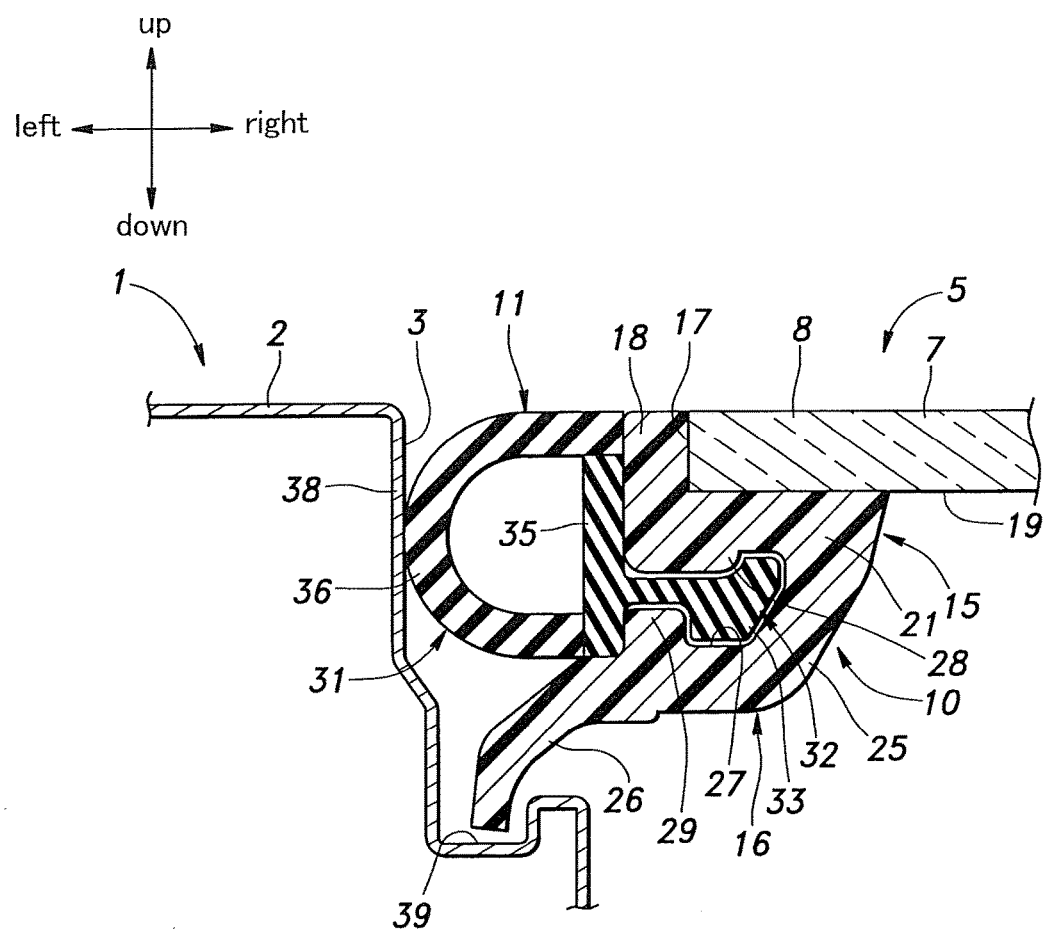
FIG. 2 is a sectional view taken along line II-II of FIG. 1 showing the peripheral part of the window module.
Figure 3:
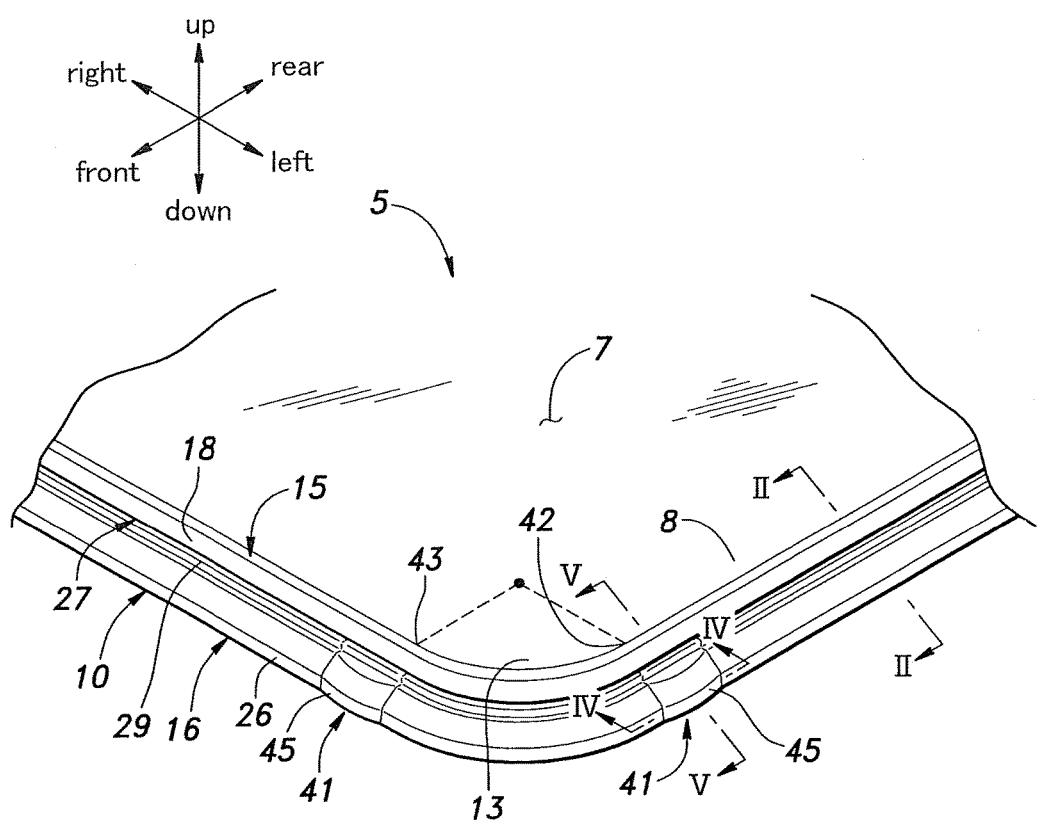
FIG. 3 is a perspective view of the window panel and the molding with the weather strip omitted from the illustration.

FIG. 2 is a sectional view taken along line II-II of FIG. 1 showing the peripheral part of the window module. As shown in FIG. 2, the window module 5 includes a window panel 7, a molding 10 attached to a peripheral part 8 of the window panel 7 and a weather strip 11 supported by the molding 10. The window panel 7 consists of a substantially rectangular plate member made of glass or plastic. FIG. 3 is a perspective view of the window panel and the molding with the weather strip omitted from the illustration. As shown in FIG. 3, each corner portion 13 of the rectangular peripheral part of the window panel 7 is defined by a pair of adjoining side edges smoothly joined to each other via an arcuate section. The window panel 7 is fixedly secured to the sliders of the opening mechanism via plastic fasteners (clips) or a bonding agent.

The molding 10 is provided along the peripheral part 8 of the window panel 7, thereby defining a frame. The molding 10 is integrally attached to the window panel 7 by outsert molding thermoplastic resin along the peripheral part 8 of the window panel 7. A bonding agent (primer, not shown in the drawings) is interposed in the interface between the molding 10 and the window panel 7 to ensure a strong attachment. The molding 10 may consist of, for instance, polystyrene elastomer (TPS), polyolefin elastomer (TPO) or polyvinyl elastomer (PVC). The bonding agent may consist of any bonding agent that can attach the molding 10 to the window panel 7 in a favorable manner, but may consist of, not exclusively, an olefin bonding agent when the window panel 7 consists of sheet glass and the molding 10 consists of polystyrene elastomer.

As shown in FIG. 2, the molding 10 includes a base portion 15 bonded to the peripheral part 8 of the window panel 7 and a projection 16 projecting from the base portion 15. The base portion 15 includes an upper base portion 18 extending in the widthwise (vertical) direction of the window panel 7 so as to cover the entire end surface 17 of the window panel 7 and a lower base portion 21 extending from the lower end of the upper base portion 18 along the lower surface (rear surface or inboard surface) 19 of the peripheral part 8 so as to define a substantially L-shaped cross section. The base portion 15 is attached to the window panel 7 at both the upper base portion 18 and the lower base portion 21. The upper end surface (outboard end surface) of the upper base portion 18 is flush with the upper surface (outer surface or outboard surface) of the window panel 7. The upper base portion 18 and the lower base portion 21 extend along the peripheral part 8 of the window panel 7 defining a closed ring.

The direction in parallel with the major surface of the window panel 7 is referred to as "inward of the window panel 7" when directed toward the center of the window panel (rightward in FIG. 2), and as "outward of the window panel 7" when directed in the opposite direction (leftward in FIG. 2). The projection 16 extends from the inner end of the lower base portion 21 downward and outward with respect to the window panel 7 at an angle while defining a hook portion 25 curving and extending further outwardly with respect to the window panel 7 and a gutter portion 26 extending further outward and downward with respect to the window panel 7 from the free end of the hook portion 25.

The hook portion 25 defines an engagement groove 27 opening outward with respect to the window panel 7 in cooperation with the lower base portion 21. The outer end part of the lower base portion 21 is formed with an upper engagement projection 28 projecting downward, and the free end part of the hook portion 25 is formed with a lower engagement projection 29 projecting upward toward the upper engagement projection 28. The upper engagement projection 28 and the lower engagement projection 29 thus jointly define a narrowed open end of the engagement groove 27. The lateral dimension (as measured in the inward and outward direction of the window panel 7) of the lower engagement projection 29 is smaller than that of the upper engagement projection 28. The engagement groove 27, the upper engagement projection 28 and the lower engagement projection 29 extend along the length of the molding 10 so that the engagement groove 27 is formed as an annular groove.

The weather strip 11 is provided with a tubular seal portion 31 and an engagement portion 32 projecting from the seal portion 31. The engagement portion 32 is provided with an enlarged head portion 33 in the free end portion which is fitted into the engagement groove 27 to be retained therein by the upper engagement projection 28 and the lower engagement projection 29. To retain the engagement portion 32 without any play, the vertical dimension of the engagement groove 27 is smaller than the vertical dimension of the engagement portion 32 so that the engagement portion 32 is resiliently squeezed from above and below by virtue of the elasticity of the molding 10.

The seal portion 31 and the engagement portion 32 are given with an annular configuration, and extend along the peripheral part 8 of the window panel 7. The seal base portion 35 of the seal portion 31 from which the engagement portion 32 extends and the engagement portion 32 are made of a plastic material different from the plastic material of a seal free end portion 36 or the remaining part of the seal portion 31 (other than the seal base portion 35). The seal free end portion 36 is made of rubber or soft plastic material having a greater flexibility than the seal base portion 35 and the engagement portion 32 that are made of rubber or plastic material less flexible than the seal free end portion 36. The seal free end portion 36, the seal base portion 35 and the engagement portion 32 are integrally formed by a double molding process, for instance. The seal portion 31 is provided with an outer surface which is flush with the upper end surface of the upper base portion 18. The seal portion 31 resiliently engages the edge wall 38 of the sunroof opening 3 when the window module 5 is in the closed position, thereby sealing the gap between the window module 5 and the sunroof opening 3.

The gutter portion 26 is located above a water collecting gutter 39 formed along the edge of the sunroof opening 3 to guide the rainwater that has passed through the gap between the seal portion 31 and the edge wall 38 of the sunroof opening 3.

As shown in FIG. 3, easily deformable portions 41 are provided in appropriate locations of the projection 16 arranged along the length of the peripheral part 8 of the window panel 7. In the illustrated embodiment, the easily deformable portions 41 are formed at a start portion 42 where the curving of the corner portion 13 of the window panel 7 starts and an end portion 43 where the curving ends, respectively, or in the terminal portions of the R (curvature) on either end of the corner portion 13. Each easily deformable portion 41 may be positioned in terms of the lengthwise positioning such that one end of the easily deformable portion 41 corresponds to the start portion 42 or the end portion 43, as the case may be, in terms of the lengthwise positioning, or such that the easily deformable portion 41 straddles the start portion 42 or the end portion 43, as the case may be.

Figure 4:
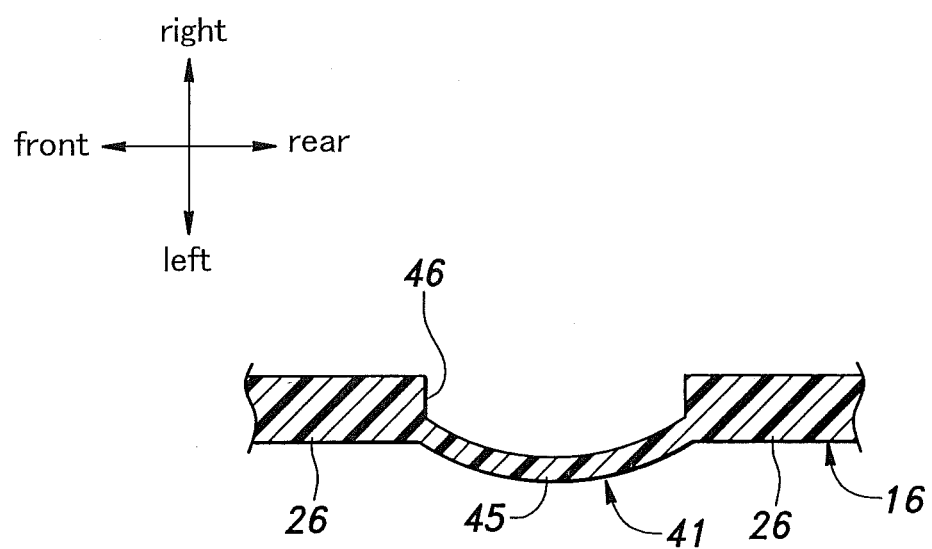
FIG. 4 is a sectional view taken along line IV-IV of FIG. 3.
Figure 5:
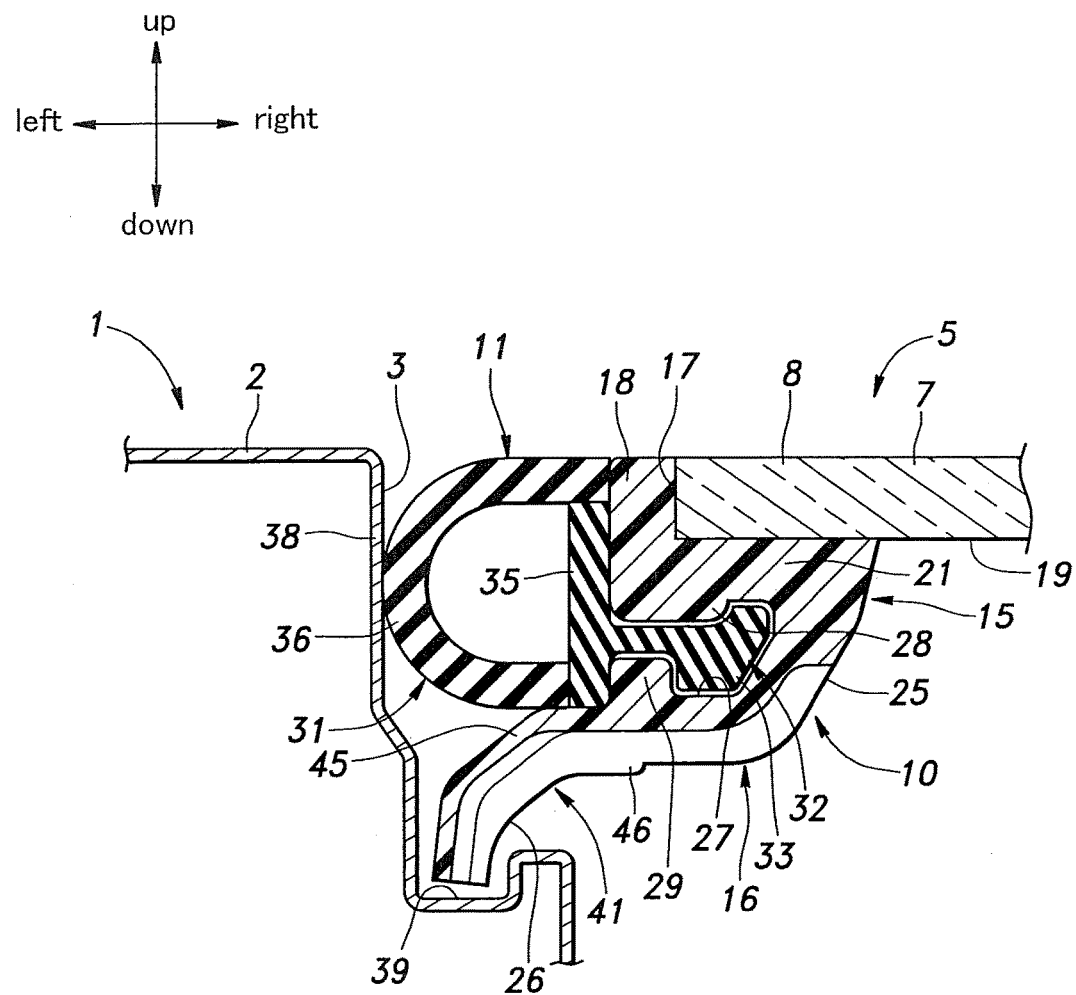
FIG. 5 is a sectional view taken along line V-V of FIG. 3.

FIG. 4 is a sectional view taken along line IV-IV of FIG. 3, and FIG. 5 is a sectional view taken along line V-V of FIG. 3. As shown in FIGS. 4 and 5, the easily deformable portion 41 consists of a thin-walled portion 45 extending from the free end edge of the gutter portion 26 and an intermediate point of the hook portion 25. The thin-walled portion 45 is formed by providing a groove 46 extending on the inboard side of the gutter portion 26 and the hook portion 25 from the free end of the gutter portion 26. The thin-walled portion 45 is given with a curved shape bulging in the outward direction of the window panel 7. In another embodiment, the thin-walled portion 45 is formed by providing a groove 46 extending on the outboard side of the gutter portion 26 and the hook portion 25, and bulges in the inward direction of the window panel 7. Each side wall of the groove 46 may extend in parallel with the thickness-wise direction of the gutter portion 26 and the hook portion 25, but may also extend at an angle with respect to the thickness-wise direction such that the surface of the thin-walled portion 45 is smoothly connected to the surface of the gutter portion 26 and the hook portion 25. The thin-walled portion 45 may also be formed over the entire region in the projecting direction of the hook portion 25.

The thin-walled portion 45 is preferably 1.0 mm thick when the thickness of the gutter portion 26 is 2.0 mm to 3.0 mm. The thin-walled portion 45 is preferably about 10 mm wide in the length-wise direction of the molding 10.

Because the thin-walled portion 45 has a smaller thickness than the remaining part of the gutter portion 26 and the hook portion 25, and is curved, the thin-walled portion 45 is more readily extendable and contractable (deformable) than the remaining part of the gutter portion 26 and the hook portion 25 along the length of the molding 10.

In this window module 5, the molding 10 is molded on the peripheral part 8 of the window panel 7, and is bonded thereto. Therefore, the molding 10 contracts as the temperature thereof drops following the molding process. In particular, the base portion 15 which is attached to the window module 5 contracts by a relatively small amount while the projection 16 remote from the window module 5 contracts by a greater amount than the base portion 15. Because the molding 10 extends along the peripheral part 8 of the window panel 7, the projection 16 contracts by a significant amount in the lengthwise direction of the molding 10. On the other hand, because the projection 16 is integral with the base portion 15 which is prevented from contracting, the projection 16 is pulled by the base portion 15. As a result, a tensile stress is produced in the projection 16. However, the thin-walled portion 45 of each easily deformable part 16 is allowed to extend freely in the lengthwise direction so that the tensile stress that is produced in the remaining gutter portion 26 and hook portion 25 can be reduced. Therefore, the deformation of the projection 16 is minimized, except for the easily deformable portion 41, owing to the reduction in the tensile stress, and the configuration of the engagement groove 27 is maintained in the originally designed condition.

In the window module 5 of the first embodiment, because the easily deformable portion 41 is provided in each of the start portion 42 and the end portion of the curvature of the corner portion 13 of the window panel 7, the tensile stress in the part of the projection 16 located adjacent to the corner portion 13 is minimized, and the deformation in this region is thereby minimized. If the easily deformable portion 41 were absent, the tensile stress acting in the lengthwise direction of the projection 16 would be combined into a force directed toward the center of the curvature of the part of the projection 16 adjoining the corner portion 13 that deforms the projection 16 along with the gutter portion 26 toward the center of the curvature.

The easily deformable portion 41 was placed in parts corresponding to either end portion of the corner portion 13, but may also be provided in appropriate positions along the length of the linear sections of the projection 16 extending along the side edge of the window panel 7, and may also be provided in the curved portions of the projection 16 corresponding to the corner portions 13. The number of the easily deformable portions 41 may also be selected as desired.

The easily deformable portion 41 of the first embodiment not only mitigates the stress caused by the shrinkage following the molding process but also reduces the stress caused in the molding due to the changes in the external temperature. The easily deformable portion 41 also shuts off or blocks the transmission of stress created in a part of the molding for causes such as the mechanical contact with an object.

Figure 6:
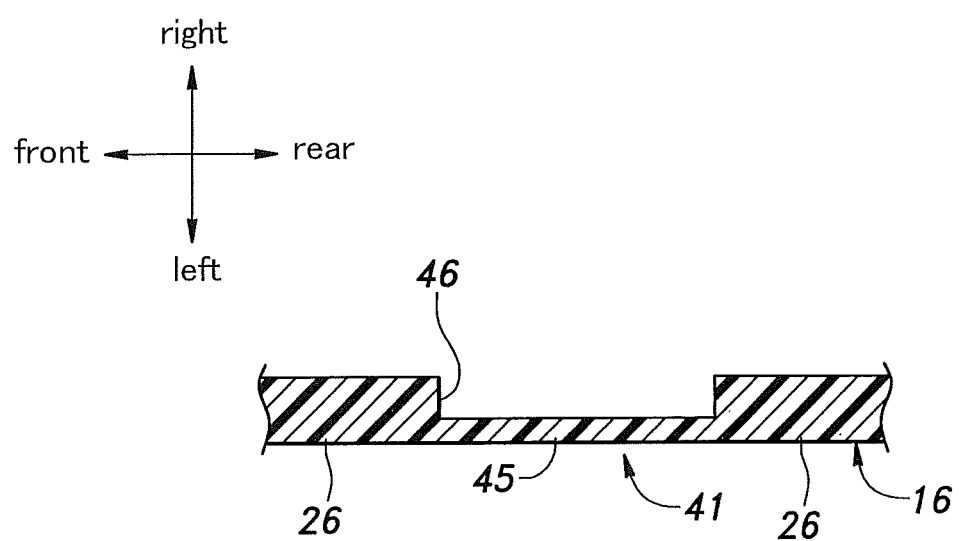
FIG. 6 is a sectional view showing a modified embodiment of the molding.

FIG. 6 is a sectional view showing a modified embodiment of the molding. As a modification of the easily deformable portion 41 discussed above, the shape of the thin-walled portion 45 may be changed from the curved shape to a linear shape. The position of the cross section of the thin-walled portion shown in FIG. 6 corresponds to that of the cross section in FIG. 4. Although the thin-walled portion 45 is not curved, because the thin-walled portion 45 is thinner than the remaining part of the projection 16, and is therefore able to readily elongate and contract (deform) in the lengthwise direction, it can equally provide the function of the thin-walled portion. According to this arrangement, the outer profile of the projection 16 can be made uniform so that the esthetic effect is enhanced.

Figure 7:
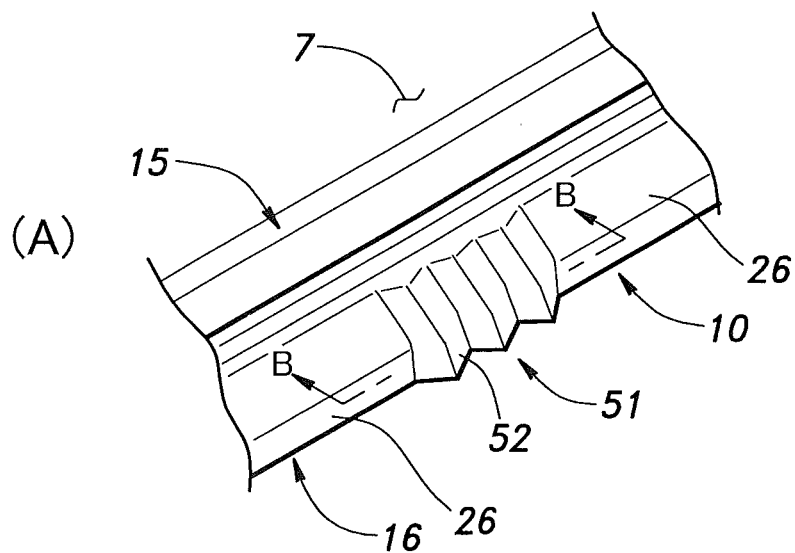
FIG. 7A is a perspective view showing another modified embodiment of the molding.
FIG. 7B is a sectional view taken long line B-B of FIG. 7A.
Figure 7:
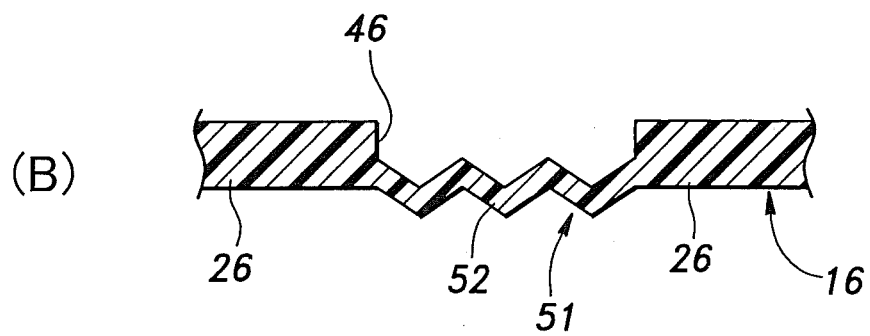
Figure 8:
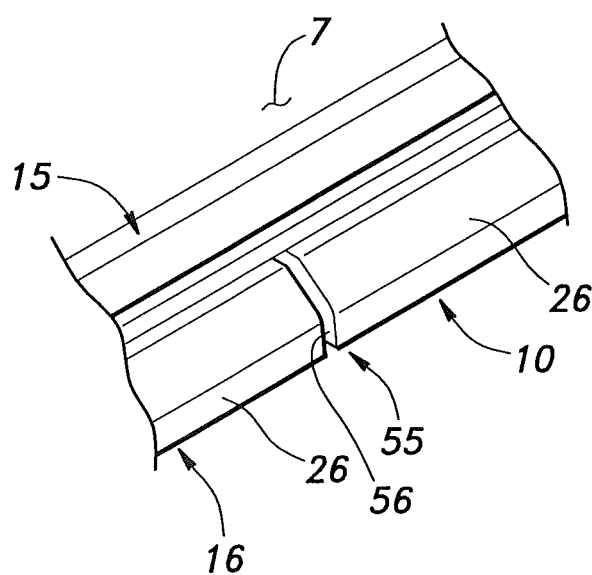
FIG. 8 is a perspective view showing yet another modified embodiment of the molding.

FIGS. 7 and 8 are sectional views showing other embodiments of the easily deformable portion. In the embodiment illustrated in FIG. 7, the easily deformable portion 51 is provided with a bellows structure 52 configured to readily extend and contract in the lengthwise direction of the projection 16. In this bellows structure 52, the section taken along the lengthwise direction of the projection 16 shows a plate bent in a zigzag shape or in a wavy shape. The thickness of the member forming the bellows structure 52 is preferably smaller than those of the gutter portion 26 and hook portion 25. The bellows structure 52 extends in dependence on the tensile stress produced in the projection 16, thereby reducing the tensile stress produced in the remaining part of the projection 16 other than the easily deformable portion 51, and controlling the deformation of the projection 16.

In the modified embodiment shown in FIG. 8, the easily deformable portion 55 comprises a slit 56 cut into the projecting end of the gutter portion 26 and extends to an intermediate point of the hook portion 25 as seen in the projecting direction. When a tensile stress is produced along the lengthwise direction of the projection 16, the slit 56 is caused to open out in the lengthwise direction of the projection 16, thereby reducing the tensile stress, and controlling the deformation of the remaining part of the projection 16 other than the easily deformable portion 51.

Figure 9:
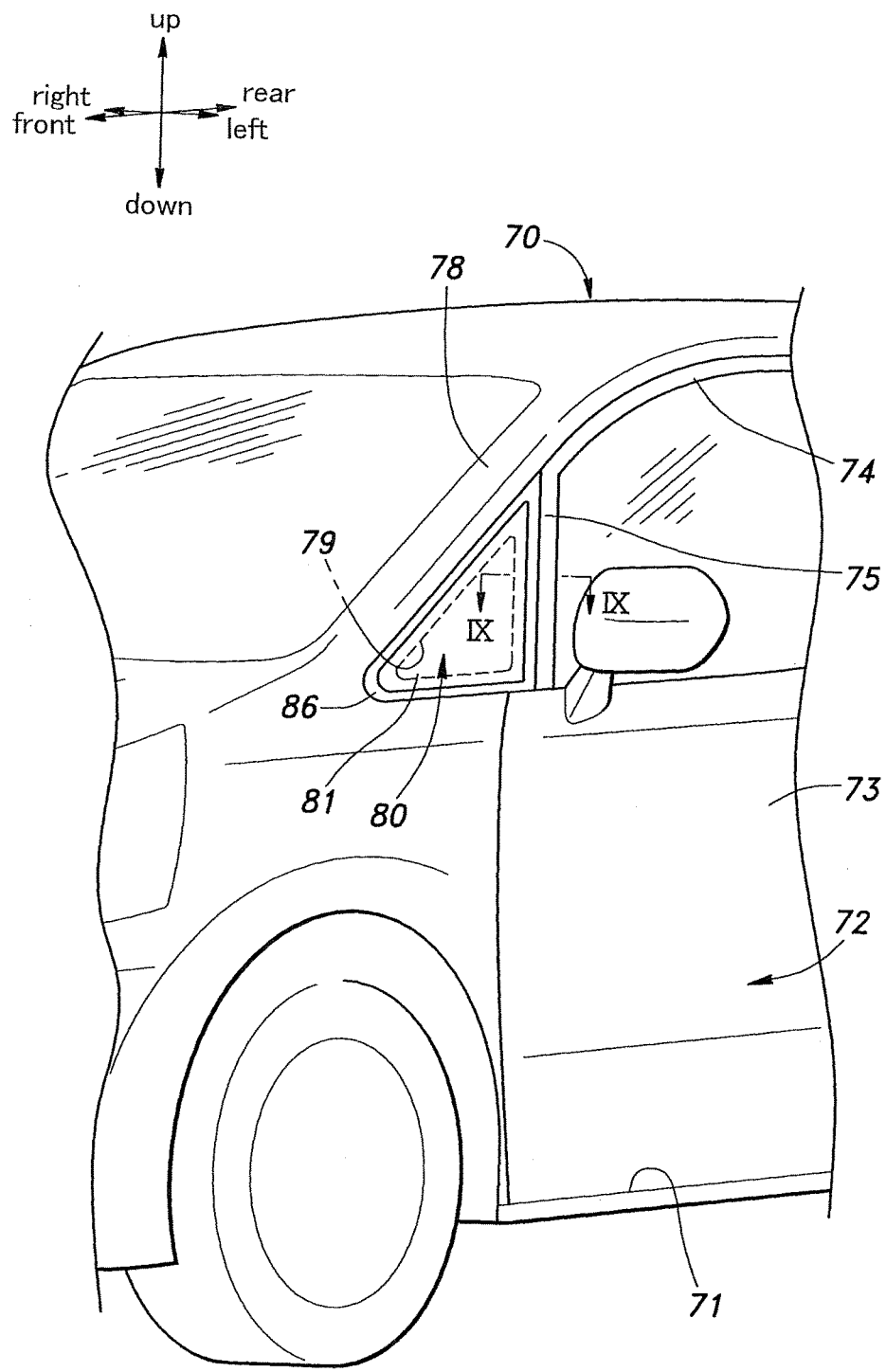
FIG. 9 is a perspective view of a front structure of a vehicle in which the window module of the second embodiment of the present invention is fitted in a triangular window opening.
Figure 10:
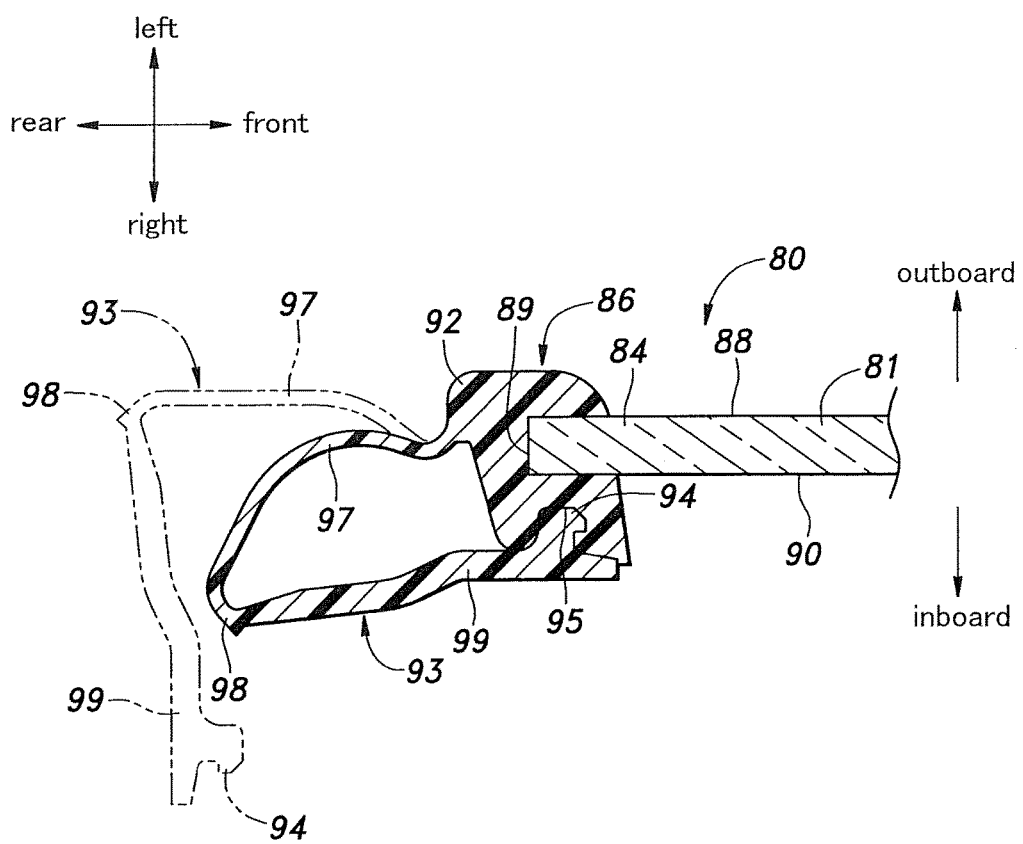
FIG. 10 is a sectional view taken along line IX-IX of FIG. 9 to show a peripheral part of the window opening.
Figure 11:
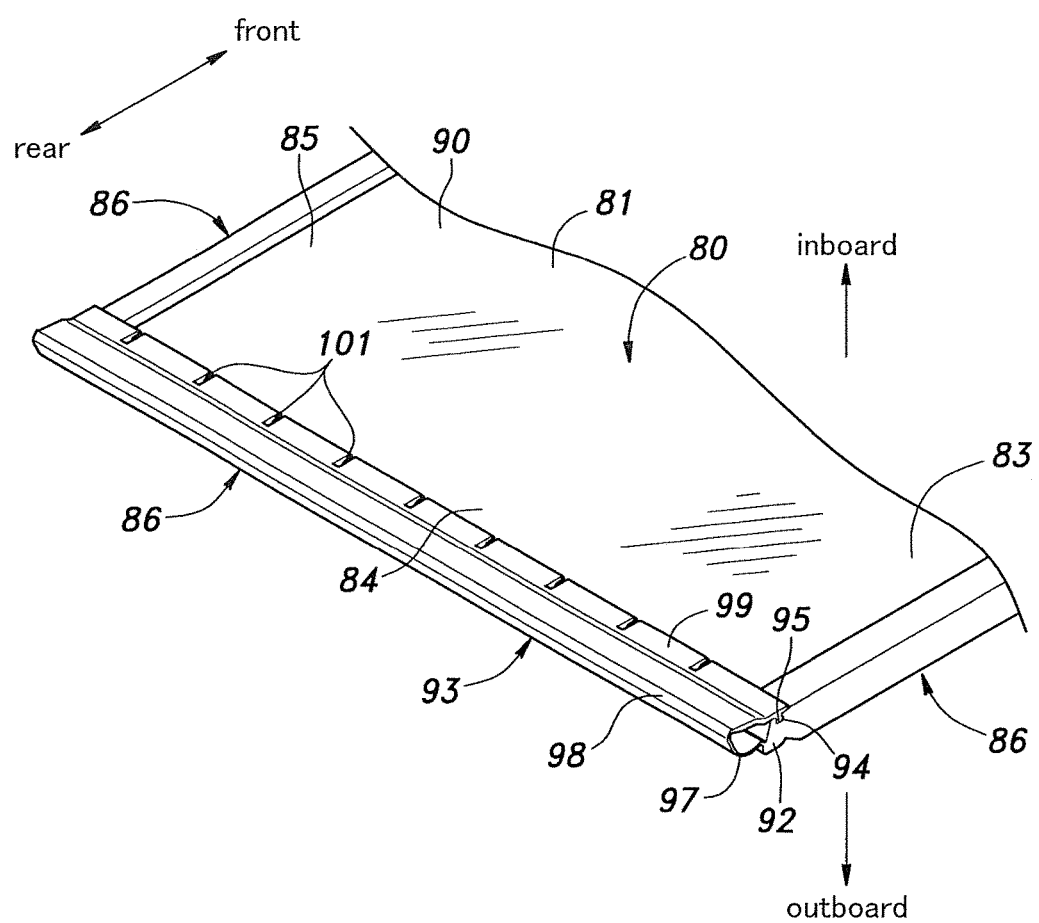
FIG. 11 is a perspective view showing the assembled state of the molding.
Figure 12:
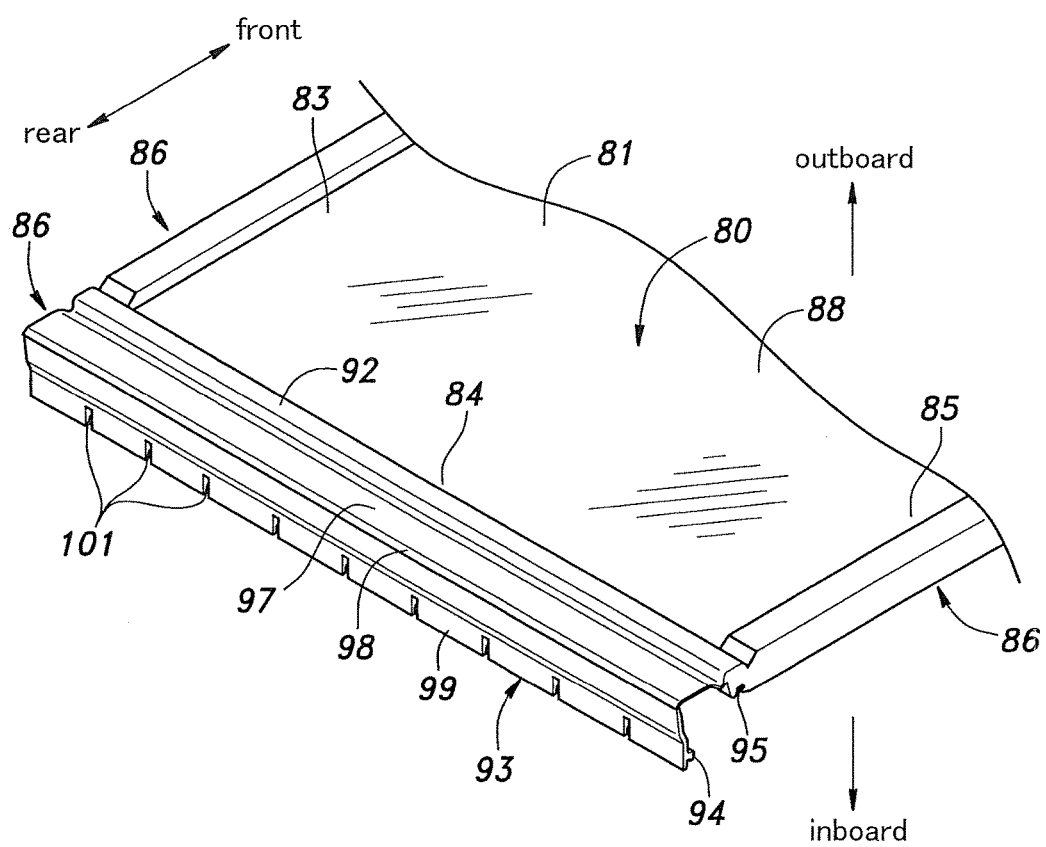
FIG. 12 is a perspective view of the molding before assembly.

A window module applied to a front fixed window of a vehicle given as a second embodiment of the present invention is described in the following with reference to FIGS. 9 to 12. FIG. 9 is a perspective view of a front structure of a vehicle in which the window module of the second embodiment is fitted in a triangular window opening. FIG. 10 is a sectional view taken along line IX-IX of FIG. 9 to show the rear peripheral part of the window module. FIG. 11 is a perspective view showing the assembled state of the molding, and FIG. 12 is a perspective view of the molding before assembly.

As shown in FIG. 9, a front door opening 71 is formed in a front side part of a vehicle body 70, and can be selectively closed by a front side door 72 supported by the vehicle body 70 via hinges. The front side door 72 is provided with a door panel portion 73 and a door sash portion 74 having a frame configuration and provided in the upper part of the door panel portion 73. The front edge 75 of the door sash portion 74 is offset rearward with respect to the front edge 76 of the door panel portion 73.

A triangular window opening 79 having a triangular shape is provided between the front door opening 71 and the front pillar 78, and is permanently closed by a window module 80 constructed as a front fixed window. The window module 80 includes a triangular window panel 81 and a molding 86 molded along and fixedly joined to the peripheral part 83, 84 and 85 of the window panel 81. The window panel 81 is attached to the vehicle body 70 by fasteners (such as clips). The materials of the window panel 81 and the molding 86 are similar to those of the window panel and the molding of the first embodiment, and the forming method of the molding 86 is also similar to that of the first embodiment.

The window panel 81 includes a lower peripheral part 83 extending in the fore and aft direction, a rear peripheral part 84 extending from the rear end of the lower peripheral part 83 upward in a vertical direction and an upper front peripheral part 85 extending obliquely between the front end of the lower peripheral part 83 and the upper end of the rear peripheral part 84. The rear peripheral part 84 extends in parallel with the front edge 75 of the door sash portion 74 in the closed sate at a certain distance therefrom.

The molding 86 wraps around the front surface (outboard surface) 88, the end surface 89 and the rear surface (inboard surface) 90 of each of the lower peripheral part 83 and the upper front peripheral part 85. As shown in FIGS. 10 and 11, the part of the molding 86 attached to the rear peripheral part 84 includes a base portion 92 wrapped around the front surface 88, the end surface 89 and the rear surface 90 of the rear peripheral part 84, and a thin lip portion (projection) 93 projecting from the base portion 92. The base portion 92 and the lip portion 93 extend over the entire length of the rear peripheral part 84. The lip portion 93 is caused to take a tubular configuration when an engagement piece portion 94 projecting from the free end of the lip portion 93 is engaged by an engagement groove 95 formed in the base portion 92.

As shown by the broken lines in FIG. 10 as well as in FIG. 12, the lip portion 93 includes a lip base portion 97 extending from the part of the base portion 92 corresponding to the end surface 89 of the rear peripheral part 84 in the outward direction (rearward) with respect to the window panel 81 and a lip free end portion 99 extending from the free end of the lip base portion 97 to the rear surface 90 of the window panel 81 via a bent portion 98 which is bent substantially at a right angle. The engagement piece portion 94 extends substantially perpendicularly from the lip free end portion 99. As shown in these drawings, the molding 86 is outsert molded on the window panel 81 with the engagement piece portion 94 disengaged from the engagement groove 95.

As shown in FIGS. 11 and 12, a plurality of slits (easily deformable parts) 101 are arranged along the length of the lip free end portion 99, each slit 101 being cut from the free end edge of the lip free end portion 99 to the bent portion 98 and passed across the thickness of the lip free end portion 99, thereby creating discontinuities in the engagement piece portion 94 along the lengthwise direction thereof. The engagement groove 95 extends along the length of the base portion 92 in the part thereof corresponding to the rear surface 90 of the rear peripheral part 84 of the window panel 81.

By the engagement piece portion 94 being engaged by the engagement groove 95, the lip portion 93 takes a tubular shape so that the bent portion 98 defines the most protruding side edge part with respect to the rear peripheral part 84. When the lip portion 93 takes the tubular shape, the lip free end portion 99 is located inboard of the lip base portion 97 so that the slits 101 are not visible from the exterior of the vehicle. The lip portion 93 in the tubular shape resiliently engages the front edge 75 of the door sash portion 74, and seals the gap between the window panel 81 and the door sash portion 74.

Owing to the provision of the slits 101 in the lip free end portion 99 serving as easily deformable portions, the window module 80 of the second embodiment allows the tensile stress that is produced in the lip portion 93 following the molding process to be reduced, similarly as the first embodiment discussed above. Owing to the reduction in the tensile stress in the lip portion 93, the lip portion 93 in the tubular shape is allowed to maintain the shape thereof. If no slits 101 were provided, and a relatively large tensile stress were hence present in the lip portion 93, the mode of deformation of the lip portion 93 would be affected by the tensile stress, and the tubular shape would be deformed. For instance, the bent portion 98 in the tubular shape would be deformed in the inboard direction so that the resilient contact with the front edge 75 of the door sash portion 74 may not be achieved.

The slits 101 of the second embodiment may be substituted by other easily deformable portions such as thin-walled portions and bellow structures similarly as in the first embodiment. It is also possible to provide the engagement piece portion 94 in the base portion 92 instead of in the lip free end portion 99, and the engagement groove in the lip free end portion 99 instead of in the base portion 92. When the engagement piece portion 94 is provided in the base portion 92, an engagement hole consisting of a through hole may be provided in the lip free end portion 99 to engage the engagement piece portion 94.

Although the present invention has been described in terms of preferred embodiments thereof, it is obvious to a person skilled in the art that various alterations and modifications are possible without departing from the scope of the present invention. For instance, the projection 16 (lip portion 93) may have a simple plate-like configuration to resiliently engage the peripheral wall of the opening. The window module of the present invention was applied to a closure member for closing a sunroof opening, and to a front fixed window in the foregoing embodiments, by may also be applied to other window modules such as rear quarter windows.

GLOSSARY 3 sunroof opening
5 window module
7 window panel
8 edge
10 molding
11 weather strip
13 corner portion
15 base portion
16 projection
25 hook portion
26 gutter portion
27 engagement groove
31 seal portion
32 engagement portion
41 easily deformable portion
42 start point
43 end point
45 thin-walled portion
46 groove
51 easily deformable portion
52 bellows structure
55 easily deformable portion 56 slit
79 triangular window opening
80 window module
81 window panel
86 molding
92 base portion
93 lip portion (projection)
94 engagement piece portion
95 engagement groove (engagement hole)
97 lip base portion (base end portion)
98 bent portion
99 lip free end portion (free end portion)
101 slit

The invention claimed is:

1. A window module, comprising a window panel and a molding molded on and attached to a peripheral part of the window panel:
    wherein the molding comprises:
        a base portion extending along and attached to the peripheral part; and
        a projection projecting from and extending along the base portion;
    wherein the projection is provided with an easily deformable portion at least in a part of the projection located along a lengthwise direction of the peripheral part, the easily deformable portion being deformable in the lengthwise direction of the peripheral part more readily than a remaining part of the projection; and
    wherein the projection includes a hook portion extending from the base portion in a curved manner to define, in cooperation with the base portion, an engagement groove opening outward to engage with an engagement portion of a weather strip, the easily deformable portion including a thin-walled portion formed in the hook portion.

2. The window module according to claim 1, further comprising-the weather strip including the engagement portion, engaged with the engagement groove.

3. The window module according to claim 2, wherein the peripheral part of the window panel includes a corner portion curving in an arcuate shape, and the easily deformable portion is located in a part including a start point at which the corner portion starts curving.

4. A window module, comprising a window panel and a molding molded on and attached to a peripheral part of the window panel:
    wherein the molding comprises:
        a base portion extending along and attached to the peripheral part; and
        a projection projecting from and extending along the base portion;
    wherein the peripheral part of the window panel includes a corner portion curving in an arcuate shape,
    wherein the projection is provided with an easily deformable portion at least in a part of the projection located along a lengthwise direction of the peripheral part, the easily deformable portion being deformable in the lengthwise direction of the peripheral part more readily than a remaining part of the projection,
    wherein the easily deformable portion is located in a part including a start point at which the corner portion starts curving, and
    wherein the projection includes a hook portion extending from the base portion in a curved manner to define, in cooperation with the base portion, am engagement groove opening outward to engage with an engagement portion of a weather strip, the easily deformable portion including a thin walled portion formed in the hook portion.

* * * * *